United States Patent [19]

Thorne et al.

[11] Patent Number: 5,202,377
[45] Date of Patent: Apr. 13, 1993

[54] POLYISOCYANATE MIXTURE

[75] Inventors: Stephen J. Thorne, Reading; Alan J. Backhouse, South Ascot, both of England

[73] Assignee: Imperial Chemical Industries, London, England

[21] Appl. No.: 883,527

[22] Filed: May 15, 1992

[30] Foreign Application Priority Data

May 30, 1991 [GB] United Kingdom ............... 9111622

[51] Int. Cl.$^5$ .............................................. C08G 18/06
[52] U.S. Cl. .................................... 524/591; 524/839; 525/127; 525/440; 528/49; 252/182.2; 252/182.21; 252/182.22
[58] Field of Search ................ 524/591, 839; 525/127, 525/440; 528/49; 252/182.2, 182.21, 182.22

[56] References Cited

U.S. PATENT DOCUMENTS 5,081,203 1/1992 Pedain et al. .................. 528/49

FOREIGN PATENT DOCUMENTS 0369389 5/1990 European Pat. Off.
1444933 8/1976 United Kingdom.
2018796 10/1979 United Kingdom.

*Primary Examiner*—Maurice J. Welsh
*Attorney, Agent, or Firm*—Thomas M. Schmitz

[57] ABSTRACT

A polyisocyanate mixture which is emulsifiable in water comprising;
(i) An isocyanate functional oligomer, which is the reaction product of;
(a) a polyisocyanate having tertiary isocyanate groups, and
(b) a hydrophilic polyether having a group which will react with tertiary isocyanate groups, and
(ii) a polyisocyanate having tertiary isocyanate groups.

The polyisocyanate mixtures can be used with suitable filmforming polymers to make aqueous coating compositions.

17 Claims, No Drawings

POLYISOCYANATE MIXTURE

This invention relates to polyisocyanate mixtures and to processes for preparing them, to coating compositions containing the polyisocyanate mixtures and to processes for making the these coating compositions. The application also relates to a process of coating using the coating compositions and to an article coated by the process.

Coating compositions which comprise hydroxy functional polymers and a polyisocyanate compound have been known for some years. These traditionally comprise a hydroxyl functional acrylic polymer together with a polyisocyanate compound in solution in an organic solvent. On evaporation of the solvent the isocyanate groups on the polyisocyanate react with the hydroxyl groups on the acrylic polymer so as to form a crosslinked film. Such reaction takes place at room temperature or at moderately elevated temperatures.

One problem with these types of composition is that the components react together from the time that the compositions are made and eventually form a crosslinked semisolid or gel. The compositions therefore have a limited 'potlife' during which they can be applied as a liquid coating.

As a result of their limited potlife, such compositions are usually sold as two separate components which are mixed together shortly before use. One component contains the acrylic polymer solution or dispersion and the other component contains the polyisocyanate. The components are taylored so that they can be combined together by relatively unskilled personnel using a minimum of equipment. In practice the components are often mixed manually simply by stirring them together in an open container using a stirring rod or spatula.

In recent years there has been a move towards waterborne coating compositions. These produce less atmospheric pollution than solventborne coatings, represent much less of a fire hazard during storage and use and allow a pleasanter working environment for those involved in their application, particularly when the compositions are applied by spray.

One problem is to find waterborne compositions which have comparable properties to the solventborne compositions which they are intended to replace.

Many different waterborne hydroxy functional acrylic polymers are known. These can be either in the form of aqueous solutions such as those disclosed in J.Coatings Tech. 55,698 pp59 to 65, or as aqueous dispersions such as those disclosed in European Patent EP.B.0038 27.

Certain waterborne polyisocyanates are also known. British Patent 1 444 933 describes an aqueous emulsion of a polyisocyanate made using a non ionic surfactant based on polyethylene glycol. European Patent EP B 358 979 describes an aqueous composition comprising an emulsion of a polyisocyanate and a hydroxyl functional addition polymer in which the polyisocyanate emulsion is stabilised by the addition polymer.

European Patent EP B 206 059 describes compositions comprising an aqueous emulsion of a polyisocyanate made using a stabiliser which is the product of the reaction between a polyisocyanate and a polyethylene glycol.

These aqueous emulsions of polyisocyanates are said to have good colloidal stability, that is the compositions do not separate out into two phases on standing.

However, these known aqueous emulsions suffer from the problem that the isocyanate groups on the polyisocyanate react with the water on standing. The products of the reaction are a polyurea and carbon dioxide gas. The reaction of the isocyanate group with water in such emulsions leads to problems of reduced isocyanate functionality and increased molecular weight in the polyisocyanate, and the unwanted evolution of carbon dioxide gas from the emulsion.

Reduced isocyanate functionality leads to poorer film performance when these polyisocyanates are used with hydroxyl functional polymers in coating compositions. Film formed from compositions containing these polyisocyanate emulsions and a hydroxyl functional acrylic polymer which have been left standing for a short period before application show markedly worse clarity, hardness, water and solvent resistance when compared with films formed from freshly prepared mixtures.

An increase in the molecular weight of the polyisocyanate leads to an increase in its viscosity. This leads to poor flow out and a poor appearance in subsequently formed film.

The evolution of carbon dioxide gas causes problems of pressure build up if the compositions are kept stored in sealed containers. Another problem caused by the evolution of carbon dioxide gas is that it leads to foaming in the composition which can cause defects in the final film.

European Patent EP B 0 130 322 describes the production of aqueous addition polymer dispersions by emulsion polymerisation of a mixture of monomers including metaisopropenyl-alpha, alpha-dimethyl benzyl isocyanate.

Such a dispersion polymer has the disadvantage that it is too high in molecular weight to be useful in many compositions in which a relatively low molecular weight oligomer is required as a crosslinker for a relatively high molecular weight hydroxyl functional polymer.

Another disadvantage of this composition is that the polyisocyanate is made in the presence of the aqueous phase. This means that the polyisocyanate is in contact with water from the moment that it is produced. This results in a polyisocyanate whose isocyanate functionality declines immediately from the time of its manufacture.

A further problem of these compositions is that the surfactant which must be used during the emulsion polymerisation process causes a reduction in the water resistance of the final film formed when the polyisocyanates are used in coating compositions.

We have now found novel polyisocyanate mixtures which can be stored in the absence of water, and which can be easily emulsified in water to form aqueous emulsions. These aqueous emulsions are colloidally stable and retain a high proportion of their isocyanate functionality for a period comparable with the useful life of known polyisocyanates in solvent-borne systems.

According to the present invention there is provided a polyisocyanate mixture, which comprises;
(i) an isocyanate functional oligomer which is the reaction product of
   (a) a polyisocyanate having tertiary isocyanate groups, and
   (b) a hydrophilic polyether having a group which will react with tertiary isocyanate groups, and
(ii) a polyisocyanate having tertiary isocyanate groups.

The polyisocyanate mixtures of the invention readily emulsify in an aqueous medium to form self stabilised emulsions. This means that the polyisocyanate mixtures will form aqueous emulsions which are stable against flocculation or settling without the need for added stabilisers or emulsifiers.

Aqueous emulsions of these polyisocyanate mixtures show good stability of the isocyanate groups to reaction with water. This means that aqueous compositions containing the polyisocyanate mixtures of the invention remain useful for many hours after they are made.

Preferred polyisocyanate mixtures contain from 1 to 20% by non volatile weight of NCO groups, more preferably from 5 to 15%.

An important parameter in obtaining emulsifiable polyisocyanate mixtures is the quantity of hydrophilic polyether moiety present. The isocyanate mixtures preferably comprise from 2 to 80%, more preferably from 2 to 35%, most preferably 5 to 20% by weight of hydrophilic polyether moiety derived from the hydrophilic polyether (b).

Preferably the oligomer has a molecular weight of 500 to 5,000, more preferably 700 to 4,000 and most preferably 1,000 to 2,000.

Preferably the oligomer has an average isocyanate functionality of at least 1.1, more preferably from 1.5 to 4.5 and most preferably 2 to 3.

The polyisocyanate (a) has tertiary isocyanate groups of the formula;

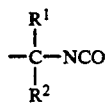

in which $R^1$ and $R^2$ are lower alkyl, for example $C_{1-6}$ alkyl, preferably methyl groups.

The polyisocyanate (a) preferably has an average isocyanate functionality per molecule of 2 to 6 and most preferably from 2.5 to 3.5.

The polyisocyanate (a) can be an aliphatic or aromatic diisocyanate. One example of a suitable diisocyanate is meta 1,3-bis(isocyantto -1- methylethyl) benzene which is commercially available, as TMXDI from the American Cyanamid Company.

Alternatively, and preferably, the polyisocyanate (a) can be the reaction product of an aromatic or aliphatic diisocyanate as described above with a polyol. A polyol is a compound having 2 or more OH groups. Preferred polyols have between 2 and 6 OH groups more preferably 3 OH groups.

Examples of suitable polyols are pentaerythritol, propane-1,2 3-triol and trimethylol propane. The polyol is preferably trimethylol propane.

A preferred polyi~ocyanate is the reaction product of three moles of 1,3-bis (1-isocyanato-1-methylethyl) benzene with one mole of trimethylol propane. Polyisocyanates of this type are described in European Patent EP 0 182 996, and are available commercially under the trademark 'Cythane' from American Cyanamid, for example 'Cythane 3160' is a solution of this polyisocyanate in a 1:1 mixture of methyl ethyl ketone and butyl acetate.

The hydrophilic polyether can be an alkyl poly(alkylene oxide). Suitable alkyl poly(alkylene oxide)s have the formula;

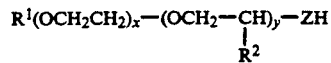

which can have a block or random structure and in which R1 is an alkyl group containing 1 to 4 carbon atoms, preferably a methyl group, $R^2$ is a methyl group or an ethyl group, preferably a methyl group, x is greater than 7, preferably from 10 to 45 more preferably from 10 to 30, most preferably 17, y is from 0 to x/3, preferably 0, and Z is oxygen, or NH, preferably oxygen.

Preferred poly (alkylene oxide)s have a molecular weight in the range 300 to 2500, more preferably 350 to 2000 and most preferably 700 to 1500.

Hydrophilic polyethers of this type are available commercially. For example, methoxy poly(ethylene oxide) is widely available in a range of molecular weights from about 350 to more than 2000, and alkoxy poly(alkylene oxide) monoamines are commercially available under the trademark 'Jeffamine' from the Texaco Chemical Company. Jeffamines come in a range of molecular weights from 500 to about 2000.

The polyisocyanate (ii) is a polyisocyanate conforming to the definition of the polyisocyanate (a) above. It does not have any hydrophilic polyether moieties. Preferably the polyisocyanate (ii) is the same as polyisocyanate (a).

The isocyanate functional oligomer can be made by reacting the polyisocyanate (a) with the hydrophilic polyether (b).

The reaction can be carried out in solution in a suitable organic solvent. Suitable solvents are those which dissolve both of the components and also the resulting hydrophilic isocyanate while not reacting with either of the components. Examples of suitable solvents are aromatic solvents such as xylene and toluene, aliphatic ketones, esters or ether esters such as 1-methoxy 2.propanol acetate and hetrocyclic solvents such as N-methyl pyrrolidone.

The components can be dissolved in the solvent and stirred, for example at 20° to 80° C. for between 30 minutes and 4 hours.

A catalyst can be used so as to accelerate the reaction between the polyisocyanate and the hydrophilic polyether. Suitable catalysts are tin compounds and tertiary amine compounds. Examples of suitable tin compounds are dibutyl tin dilaurate, dibutyl tin oxide, dibutyl tin diacetate, dimethyl tin dichloride, dimethyl tin dilaurate, dioctyl tin dilaurate and dimethyl tin dineodeconate. Many of these tin catalysts are available under the trademark 'Cotin' from Cosan Chemicals.

An example of a suitable amine catalyst is (1, 4,) diazabicyclo (2.2.2) octane available commercially under the trademark DABCO from Air Products.

Often the hydrophilic polyether contains small quantities of water which it readily absorbs from the atmosphere. This water can react with the isocyanate groups on the polyisocyanate (a) and cause problems by reducing the isocyanate functionality of the polyisocyanate. In order to minimize such problems the solution of hydrophilic polyether can be heated to reflux temperature and any water in the solution removed by azeotropic distillation before the reaction with the polyisocyanate (a) is carried out.

The polyisocyanate mixtures can be made by simply mixing the oligomer and the polyisocyanate (ii).

Alternatively, in the case where the polyisocyanate (ii) is the same as the polyisocyanate (a), the polyisocyanate mixtures can conveniently be made simultaneously with the preparation of the oligomer by reacting an excess of polyisocyanate (a) with the polyether (b). This results in the formation of the polyisocyanate oligomer in admixture with a proportion of unreacted polyisocyanate.

The polyisocyanate mixtures are useful in aqueous coating compositions as a crosslinking agent for polymers having groups reactive with isocyanate groups such as hydroxyl groups or amine groups.

According to the present invention there is also provided an aqueous coating composition which comprises;
i) a solution, emulsion or dispersion in an aqueous medium of a film-forming polymer having groups reactive with isocyanate groups, and
ii) an emulsion in the aqueous medium of a polyisocyanate mixture as described above.

The stability of the tertiary isocyanate groups to reaction with the water of the aqueous phase means that the properties of films formed from the compositions remain fairly constant at ambient temperatures irrespective of whether the compositions from which they are formed are freshly made or have been standing for several hours.

The ease of emulsification of the polyisocyanate mixtures in an aqueous medium means that the compositions are easy to make by simple manual stirring of a mixture of the polyisocyanate mixture and a solution or dispersion of the film-forming polymer.

The emulsion preferably comprises droplets of the polyisocyanate mixture having a mean droplet size of 50 to 500 nm preferably 80 to 400 nm as measured on a Malvern Autosizer IIc (Trademark; available from Malvern Instruments Ltd, England)

The composition preferably comprises from 1 to 50% by non-volatile weight of the polyisocyanate mixture based on the total non-volatile weight of the hydroxy functional film forming polymer and the polyisocyanate mixture, more preferably 2 to 30%.

Preferably the composition has a non-volatile organic content of 10 to 60% by weight, more preferably 20 to 50%.

The film forming polymer is a polymer having at least two groups which are reactive with isocyanate groups. Examples of groups reactive with isocyanate groups are hydroxyl groups and amine groups. Preferably the groups are hydroxyl groups.

Preferably when the groups reactive with isocyanate groups are hydroxyl groups, the film forming polymer has a hydroxyl value of 4 to 175, more preferably 10 to 130 mg KOH/g.

The film forming polymer can be in the form of a dispersion or solution in the aqueous medium.

The film forming polymer can be an addition polymer, a polyester polymer, a polyurethane polymer, an epoxy polymer or an alkyd polymer. Preferably it is an addition polymer or an alkyd polymer, most preferably an addition polymer.

Addition polymers comprise structural units and functional units. The functional units are derived from monomers having groups reactive with isocyanate groups. Examples of monomers having hydroxyl groups are hydroxy alkyl acrylates or methacrylates, such as hydroxyethyl acrylate, hydroxybutyl acrylate, hydroxyethyl methacrylate, hydroxypropyl methacrylate, hydroxypropyl acrylate, poly(ethylene glycol) monomethacrylate or acrylate, and the reaction product of hydroxyethyl acrylate and caprolactone available as Tone M100 from Union Carbide (Tone is a trademark). An Example of a monomer having amine groups is N-methyl aminomethacrylate The structural units are derived from monomers not having reactive groups. Examples of suitable monomers not having reactive groups are styrene, and alkyl esters, particularly $C_{1-6}$ alkyl esters, of acrylic or methacrylic acid such as methyl methacrylate and butyl acrylate.

The addition polymer can also contain units derived from other hydrophilic monomers such as acid functional monomers, for example acrylic or methacrylic acid, or monomers having non-ionic hydrophilic groups, for example poly(ethylene glycol) groups, such as poly(ethylene glycol) methacrylate.

One suitable type of hydroxy functional film forming addition polymer is described in European Patent Application EP-A-0 038 127. This Application describes a coating composition which comprises microparticles of hydroxy functional addition polymer of diameter 50 to 200 nm, dispersed in an aqueous medium. These particular microparticles are internally crosslinked. However, similar non-crosslinked particles can also be used in compositions of the present invention.

Other suitable hydroxy functional addition polymers are disclosed in British Patents GB 824340 and GB 973568, and in U.S. Pat. Nos. 3,862,071, 2,918,391, 2,787,603, 2,819,237, 3,926,888 and 3,218,280.

Hydroxy functional alkyd polymers are well known and are described on pages 159 to 164 of the book 'Introduction to Paint Chemistry' by G.P.A. Turner, second edition published by Chapman and Hall 1980. Suitable alkyd polymers are also disclosed in British Patent 1430131.

The hydroxy functional alkyd polymer can be a polyurethane modified alkyd polymer or an acrylic modified alkyd polymer.

Acrylate modified alkyds are described in U.S. Pat. No. 3,600,345, and in articles by R.R Englehardt, Proc.-Waterborne Coatings 4(4),24 and E.Levine and E.J-Kuzma J. Coatings Technology,5 (657)35.

The compositions of the invention show good stability of the isocyanate groups to reaction with water over a number of hours. However it has been found that the compositions can be stored for much longer periods, for example a year or more, as two separate components which can be mixed together shortly before use.

According to the present invention there is also provided a composition which is in the form of two separate components which, when combined, form a coating composition as described above, the composition comprising a first component which is an aqueous solution or dispersion of a film forming polymer having groups reactive with isocyanate groups and a second component which comprises a polyisocyanate mixture as described above.

The manufacture and storage of the coating composition in the form of two components has the advantage that the the polyisocyanate mixture can be stored in the absence of water. This considerably extends the useful life of the mixture.

In addition to the film-forming polymer and the polyisocyanate mixture, the compositions of the invention can also contain other ingredients that are standard for paint compositions. For example the compositions can contain a pigment which can either be a solid colour pigment or a metal flake pigment, for example an aluminium flake pigment.

The composition can also contain co-solvents for example N-methyl pyrrolidone, butyl glycol acetate, butyl diglycol acetate, ethyl ethoxy propionate, 1-methoxy-2-propanol acetate and 3-methoxy butyl acetate to aid coalescence, particularly when the film-forming polymer is in the form of a dispersion.

Other optional components include rheological modifiers and wetting agents, extenders and biocides to inhibit bacterial growth over long periods, non-polar solvents to reduce foaming during processing or application, UV absorbers and free radical scavengers.

Generally when the composition is in the form of two separate components any pigments, extenders and biocides are in the component containing the film-forming polymer. The component containing the polyisocyanate mixture can also contain water scavengers.

The compositions of the invention can be made by forming an emulsion of the polyisocyanate mixture in an aqueous solution or dispersion of the film-forming polymer.

The polyisocyanate mixtures easily form emulsions in the aqueous phase without the need for any additional dispersant or emulsifier. The emulsion can be formed by simple hand stirring of a mixture of the polyisocyanate mixture and the aqueous film forming polymer.

Mechanical means of forming emulsions such as high speed stirrers can also be used to form the emulsion of the polyisocyanate mixture but these are not necessary.

The ease of formation of aqueous emulsions of the polyisocyanate mixtures has the advantage that the two components of the coating composition can be mixed by simple manual stirring at the time when the coating composition is required for use. The mixing of the two components can therefore easily be carried out by unskilled personnel and without the need for special equipment.

The solution or dispersion of film forming polymer can be made by standard methods well known in the art.

The polymers can be made as a dispersion in water or as a solution either in water or in a water miscible organic solvent.

For example, hydroxyl functional addition polymers can be made by the polymerisation of a mixture of unsaturated polymerisable monomers comprising at least one monomer having a hydroxyl group together with other monomers in the presence of a polymerisation initiator.

For example an aqueous hydroxyl functional addition polymer can be made by first forming an emulsion of a suitable monomer mixture in water, heating the emulsion to a temperature at which polymerisation can be made to occur in the presence of a polymerisation initiator, and then adding a suitable initiator so as to cause polymerisation.

Alternatively the monomer mixture can be dissolved in a water miscible organic solvent such as isopropanol and then caused to polymerise in the presence of a suitable initiator by heating the solution. The resulting polymer solution can then be poured into water so as to form an aqueous solution or emulsion.

Examples of suitable polymerisation initiators are azo initiators such as azodiisobutyronitrile and peroxides such as benzoyl peroxide.

Examples of methods of making hydroxy functional addition polymers are disclosed in European Patent EP-B-0038127, U.S. Pat. Nos. 4 139 514 and 3 862 071 and in British Patent 940 766.

The coating compositions of the invention can be applied to a substrate surface by standard techniques such as spraying, roller coating or brushing. The composition can then either be allowed to cure at ambient temperature or can be heated to moderately elevated temperature so as to give a cured coating.

Accordingly the present invention also provides a process for coating a substrate which comprises applying a layer of a coating composition according to the invention to a surface of the substrate and thereafter causing or allowing the layer to cure.

The layer of coating can be allowed to cure simply by leaving it at ambient temperature. Alternatively it can be caused to cure by baking at low temperatures, for example 50° to 150° C. Curing occurs in a time comparable with known solventborne coatings, for example between 10 minutes and 3 hours depending on the temperature.

According to the present invention there is also provided a coated article obtainable by the process.

The following examples illustrate the invention.

EXAMPLES

I. Isocyanate Functional oligomers

1.1. Preparation of Isocyanate Functional Oligomer 1

Methoxypoly(ethylene oxide) with a molecular weight of 750 (52.6 g) was dissolved in xylene (18.3 g). The solution was heated to reflux temperature and water was removed as an azeotrope using a Dean and Stark separator. When water could no longer be removed, the solution was cooled to 50° C. A 10% by weight solution of dibutyl tin dilaurate in methyl ethyl ketone (0.05 g) and Cythane 3160* (100.0 g) was added and the mixture was stirred at 50° C. for 3 hours.

*Cythane 3160 is an 80% solution of a meta-tetramethylxylene diisocyanate/trimethylol propane adduct in a 1:1 mixture of methyl ethyl ketone and butyl acetate, available from American Cyanamid (Cythane is a trademark).

The resulting solution contained an isocyanate functional oligomer which was the reaction product of a polyisocyanate having tertiary isocyanate groups and a hydrophilic polyether. The oligomer contained 4.4% by weight of NCO groups ** and 39.6% by nonvolatile weight of methoxy poly(ethylene oxide) moiety.

**The percentage by weight of NCO groups was measured by dissolving a known weight of oligomer in toluene (25 ml) and adding dibutylamine solution (2 moles l$^{-1}$ in toluene, 20 ml). The solution was allowed to stand for 5 minutes and then the remaining amine groups were titrated against HCl (1 mole l$^{-1}$ in water) using a bromo cresol green indicator. A second titration was carried out as a control omitting the oligomer. The % NCO was calculated as $$\frac{\{\text{Control (Vol. of HCl sol.)} - \text{Sample (Vol of HCl Sol.)}\} \times 4.2}{\text{weight of sample}}$$

All the %NCO measurements in these examples were carried out in the same way.

1.2. Preparation of Isocyanate Functional Oligomer 2

Jeffamine M1000**(87.7 g) was slowly added over 14 minutes to a mixture of Cythane 3160 (100.0 g) and N-methyl pyrrolidone (33.9 g) at 40° C. with stirring and under nitrogen. Prior to the addition heating was applied but as the Jeffamine was added the mixture was cooled to maintain the temperature at 40° C. The mixture was allowed to cool to 25° C. and was stirred for 1 hour.

\*\*Jeffamine M1000 is a methoxypoly(alkylene oxide) which contains about 3 moles of propylene glycol units and about 13 moles of ethylene glycol units, and is primary amine terminated. It is available from Texaco (Jeffamine is a Trademark).

The resulting solution contained an isocyanate functional oligomer which was the reaction product of a polyisocyanate having tertiary isocyanate groups and a hydrophilic polyether.

1.3. Preparation of Comparative Isocyanate Functional Oligomer 3.

A 90% solution of the isocyanurate of hexamethylene diisocyanate (Tolonate HDT90 from Rhone Poulenc; 53.1 1g) was dissolved in N.methyl pyrrolidone (38.7g) which had been dried over calcium oxide. Jeffamine MI000 (84.2g) was added to the solution at 55° C. over 3 minutes with stirring. The mixture was stirred for 25 minutes and allowed to cool.

The resulting solution contained an isocyanate functional oligomer which was the reaction product of a polyisocyanate having primary aliphatic isocyanate groups and a hydrophilic polyether. This oligomer does not fall within the definition of the oligomer required for the compositions of the present invention.

1.4 Isocyanate Functional Oligomer 4

Jeffamine M2070\*\*\*(257 g) was slowly added to a mixture of Cythane 3160 (146.8 g) and N.methyl pyrrolidone (95.7 g) and the mixture was stirred for 30 minutes at ambient temperature.

\*\*\*Jeffamine M2070 (Trademark) is a methoxy poly(alkylene oxide) which contains about 10 propylene oxide units and about 31 ethylene oxide units, and which is primary amine terminated. It is available from Texaco.

The resulting isocyanate functional oligomer contained 2.59% by non-volatile weight of NCO groups and 68.7% by non-volatile weight of methoxy poly(alkylene oxide).

1.5. Isocyanate Functional Oligomer 5.

Methoxy poly(ethylene oxide) (Molecular weight about 2000, 206 g) was dissolved in xylene (76.5 g). The solution was heated to reflux temperature and water was removed using a Dean and Stark separator. When water could no longer be removed, the solution was cooled to 50° C. A 10% by weight solution of dibutyl tin dilaurate in methylethyl ketone (1.18 g) and Cythane 3160 (117.4 g) were added and the mixture was stirred at 50° C. for 3 hours.

The resulting isocyanate functional oligomer contained 2.59% by non-volatile weight of NCO groups and 68.7% by non-volatile weight of methoxy poly(ethylene oxide).

2. Polyisocyanate mixtures

2.1 Preparation of Polyisocyanate Mixture 1

Polyisocyanate Mixture 1 was a 1:1 by weight mixture of Isocyanate Oligomer 1 and Cythane 3160. The Mixture was made by stirring the components together at ambient temperature.

2.2. Preparation of Polyisocyanate Mixture 2

Polyisocyanate Mixture 2 was a 1:1 by weight mixture of Isocyanate Oligomer 2 and Cythane 3 60. The mixture was made by stirring the components together at ambient temperature.

2.3. Preparation of Comparative Polyisocyanate Mixture 3

Comparative Polyisocyanate Mixture 3 was a 1:1 by weight mixture of Comparative Isocyanate Oligomer 3 and Tolonate HDT90. The Mixture was made by stirring the components together at ambient temperature.

2.4 Preparation of Polyisocyanate mixture 4

Methoxy poly(ethylene oxide) of molecular weight 750 (8.56 g) was dissolved in xylene (2.98 g) and the solution was heated to reflux temperature under nitrogen. Water was removed as an azeotrope using a Dean and Stark apparatus. When no further water could be removed the solution was cooled to 50° C. and a 10% by weight solution of dibutyl tin dilaurate in methyl ethyl ketone (0.09 g) was added followed by Cythane 3160 (100.0 g). The mixture was stirred at 50° C. for 3 hours.

The result was a solution of a polyisocyanate mixture of an isocyanate functional oligomer and unreacted polyisocyanate. The mixture contained 8.9non-volatile weight of NCO groups, and 9.65% by non-volatile weight of methoxy poly(ethylene oxide) based on the total weight of the oligomer and the polyisocyanate.

2.5. Preparation of Polyisocyanate Mixture 5

Methoxy poly(ethylene oxide) of molecular weight 750 (11.89 g) was dissolved in xylene (4.13 g) and the solution was heated to reflux temperature under nitrogen. Water was removed as an azeotrope using a Dean and Stark apparatus. When no further water could be removed the solution was cooled to 50° C. and a 10% by weight solution of dibutyl tin dilaurate in methyl ethyl ketone (0.12 g) was added followed by Cythane 3 60 (100.0 g). The mixture was stirred at 50° C. for 3 hours.

The result was a solution of a polyisocyanate mixture of an isocyanate functional oligomer and unreacted polyisocyanate. The mixture contained 89% non-volatile weight of NCO groups, and 14.86% by non-volatile weight of methoxy poly(ethylene oxide) based on the total weight of the oligomer and the polyisocyanate.

2.6. Preparation of Polyisocyanate Mixture 6

Meta-tetramethylxylene diisocyanate/trimethylol propane adduct (Supplied by American Cyanamid; 75 parts) was dissolved in a mixture of butyl acetate (12.5 parts) and methyl propoxol acetate (Available under the trademark Dowanol PMA from Dow Chemicals; 12.5 parts) so as to form a polyisocyanate solution.

Methoxy poly(ethylene oxide) of molecular weight 750 (8.24 g) was dissolved in xylene (2.87 g) and the solution was heated to reflux temperature under nitrogen. Water was removed as an azeotrope using a Dean and Stark apparatus. When no further water could be removed the solution was cooled to 50° C. and a 10% by weight solution of dibutyl tin dilaurate in methyl ethyl ketone (0.009 g) was added followed by the polyisocyanate solution prepared above (100.0 g). The mixture was stirred at 50° C. for 3 hours.

The result was a solution of a polyisocyanate mixture of an isocyanate functional oligomer and unreacted polyisocyanate. The mixture contained 11.2% non-volatile weight of NCO groups, and 9.9% by non-volatile weight of methoxy poly(ethylene oxide) based on the total weight of the oligomer and the polyisocyanate.

3. Film-forming Polymers

3.1. Polymer 1; an aqueous hydroxy acrylic polymer made by a solution polymerisation route (i) A mixture of methyl methacrylate (137.7 g), butyl acrylate (1269.3 g), hydroxyethyl methacrylate (630 g), acrylic acid (63 g), Vazo 67 (polymerisation initiator from DuPont, Vazo is a Trademark; 64.8 g) and n-octyl mercaptan (21 g) was fed into isopropanol (798.9 g) at 83° C. with stirring under nitrogen over a period of 3 hours. The mixture was stirred at 83° C. for a further hour. A solution of Vazo 67 (4.8 g) in isopropanol (10.5 g) was added and the mixture was held for a further 2 hours at reflux temperature (80° to 85° C.). The mixture was allowed to cool to ambient temperature.

The result was a solution of a hydroxy functional acrylic polymer in isopropanol.

(ii) The mixture from (i) above (200 g) was heated and isopropanol (28.5 ml) was distilled off. Dimethyl aminoethanol (5.4 g) was added and the mixture was stirred for 10 minutes.

Demineralised water (340 g) at a temperature of 50° C. was added quickly and with vigorous stirring so as to form a aqueous polymer solution. The mixture was heated to reflux temperature and an approximately 50/50 mixture of isopropanol and water (63 g) was removed by distillation. The mixture was allowed to cool to ambient temperature.

The result was a solution of a hydroxy acrylic polymer in an aqueous medium which was virtually all water, the solution having a solids content of 32.1% by weight.

3.2. Polymer 2; an aqueous hydroxy acrylic polymer made by a solution polymerisation route This polymer was similar to that described in 3.1 above except that it has a higher level of acid functionality.

(i) A mixture of methyl methacrylate (95.4 g), butyl acrylate (1269.6 g), hydroxyethyl methacrylate (630 g), acrylic acid (105 g), Vazo 67 (64.8 g) and n.octyl mercaptan (21 g) was fed into isopropanol (798.9 g) at 83° C. with stirring under nitrogen over a period of 3 hours. The mixture was stirred at 83° C. for a further hour. A solution of Vazo 67 (4.8 g) in isopropanol (10.5 g) was added and the mixture was held for a further 2 hours at reflux temperature (80° to 85° C.). The mixture was allowed to cool to ambient temperature.

The result was a solution of a hydroxy functional acrylic polymer in isopropanol having a non-volatile content of 72.4% by weight.

(ii) The mixture from (i) above (1400g) was heated and isopropanol (50ml) was distilled off. Dimethyl aminoethanol (54.5 g) was added and the mixture was stirred for 10 minutes.

Demineralised water (2232 g) at a temperature of 50° C. was added quickly and with vigorous stirring so as to form a polymer solution. The mixture was heated to reflux temperature and an approximately 50/50 mixture of isopropanol and water (472 g) was removed by distillation. The mixture was allowed to cool to ambient temperature.

The result was a solution of a hydroxy acrylic polymer in an aqueous medium which was virtually all water, the solution having a solids content of 32.1% by weight.

3.3. Polymer 3; an aqueous hydroxy acrylic solution polymer made by an emulsion polymerisation route.

(i) A mixture of methyl methacrylate (26.32 g), butyl acrylate (1269.3 g), hydroxyethyl methacrylate (311.7 g), methacrylic acid (125.4 g) and n-octyl mercaptan (34.65 g) were emulsified in a mixture of demineralised water (739.6 g) and Fenopon CO436 (an anionic surfactant from the GAF Corporation; 23.96 g) using a homogeniser.

(ii) Some of the resulting emulsion (39 g) was added to a solution of Fenopon CO436 (6.35 g) in demineralised water (998.7 g) at 80° C. with stirring under nitrogen. A solution of ammonium persulphate (2.06 g) in demineralised water (17.8 g) was added and the mixture was stirred for 30 minutes at 80° C. A solution of ammonium persulphate (3.0 g) in demineralised water was added and the remaining monomer emulsion from (i) above was slowly added over 3 hours with stirring. The mixture was stirred at 80° C. for 1 hour, allowed to cool to ambient temperature and filtered through 80 micron pore size nylon mesh.

(iii) Dimethyl aminoethanol (32.4 g) was added to the polymer emulsion from (ii) above (1000 g) with vigorous stirring.

The result was an aqueous solution of a hydroxy acrylic polymer having a weight average molecular weight of 15 000 as measured by gel permeation chromatography the solution having a non-volatile content of 46.9% by weight.

3.4 Polymer 4

Preparation of aqueous dispersion of polymer microarticles

To a reactor fitted with stirrer, thermometer, reflux condenser and means for controlled introduction of two separate liquid feeds, was charged:

| | |
|---|---|
| demineralised water | 29.030 parts |
| followed by a pre-mixed blend of | |
| methyl methacrylate | 0.029 part |
| ammonium salt of sulphate of (nonylphenol + 5 mols. ethylene oxide) | 0.017 part |

The contents of the reactor were heated to 80°-85° C. with stirring and the following pre-mixed ingredients were added:

| | |
|---|---|
| butyl acrylate | 0.629 part |
| methyl methacrylate | 0.629 part | the reaction mixture was held at 80°-85° C. for 15 minutes, following which there was added a blend of:

| | |
|---|---|
| demineralised water | 0.671 part |
| ammonium persulphate | 0.021 part |

After the contents of the reactor had been held at 80°-85° C. for a further 20 minutes, the following premixed ingredients were fed into the reactor at a constant rate over 3 hours:

| | |
|---|---|
| butyl acrylate | 10.758 parts |
| methyl methacrylate | 10.189 parts |
| allyl methacrylate | 0.686 part |
| ammonium salt of sulphate of (nonylphenol + 5 mols. ethylene oxide) | 0.049 part | and simultaneously there was fed into the reactor as a steady rate, over the same period of 3 hours, a solution of 0.037 part of ammonium persulphate in 4.985 parts of demineralised water.

After completion of the above feeds, the contents of the reactor were held at 80°-55° C. for 1 hour. There was then added 34.771 parts of demineralised water and the temperature was brought back to 80°-85° C.; the following pre-mixed ingredients were then added at a constant rate over a period of 1 hour:

| | |
|---|---|
| methacrylic acid | 0.950 parts |
| butyl acrylate | 2.035 parts |
| hydroxyethyl acrylate | 1.357 parts |
| methyl methacrylate | 2.469 parts |
| ammonium salt of sulphate of (nonylphenol + 5 mols. ethylene oxide) | 0.017 part | and simultaneously, at a steady rate over the same period of 1 hour, there was fed into the reactor a solution of 0.019 part of ammonium persulphate and 0.016 part of sodium borate in 0.596 part of demineralised water.

At the completion of both feeds, the temperature of the reaction mixture was held at 80°-85° C. for 1 hour, after which it was rapidly cooled to give a stable aqueous dispersion of polymer microparticles. The dispersion had a total non-volatile solids content of 30% and a content of non-volatile solids insoluble in organic solvents of 27%.

4. Compositions and Testing

4.1. Hydrolytic stability of Isocyanate Functional Oligomers in water

The hydrolytic stability of the isocyanate groups in three unpigmented compositions containing three different waterborne Polyisocyanate Mixtures were studied by Fourier transform infra-red spectroscopy. The study was carried out by observation of the peak at 2260cm$^{-1}$ in the infra-red spectrum of these compositions which is characteristic of the isocyanate group.

The study was carried out on aqueous unpigmented compositions containing aqueous emulsions of Polyisocyanate Mixtures 1 to 3 together with Polymer 2. The aqueous clearcoat compositions were made by stirring aqueous hydroxy acrylic Polymer 2 into each of the above isocyanate mixtures. The amounts of each of the components were chosen so that the compositions contained the same number of moles of hydroxy groups as isocyanate groups. The amounts of each are given in Table 1.

TABLE 1

| | Clearcoat Compositions | | |
|---|---|---|---|
| Composition | 1 | 2 | 3 |
| Polymer 2 | 12.5 | 25.0 | 50.7 |
| Isocyanate Mixture 1 | 6.39 | | |
| Isocyanate Mixture 2 | | 13.04 | |
| Isocyanate Mixture 3 | | | 18.9 |
| Demineralised Water | 7.5 | 15.0 | 30.42 |

The clearcoat compositions given in Table 1 were tested by allowing the compositions to stand at ambient temperature in the liquid cell of an infra-red spectrometer (Specac Squarecol Liquid Cell mounted in a Bruker IFS48 FTIR Spectrometer). An infra-red spectrum was taken every five minutes. The time taken for the area under the peak at 2260cm$^{-1}$ (which is proportional to the concentration of isocyanate groups) to drop to 80% of its initial value was recorded. These times are given in Table 2.

TABLE 2

| Composition | Time to 80% isocyanate (minutes) |
|---|---|
| 1 | 500 |
| 2 | 567 |
| 3 | 120 |

It can be seen from these results that Compositions 1 and 2 according to the invention retain their level of isocyanate functionality for a much longer period than Comparative Composition 3. A time of 6 or 7 hours means that the compositions retain most of their functionality for a large proportion of a working day, whereas a time of only 2 hours means that the compositions would need to be used shortly after mixing.

4.2. Emulsification of Polyisocyanate Mixtures

In order to form clearcoats with good clarity and no haziness, it is important that the isocyanate component easily forms fine particle size emulsions. The present invention provides polyisocyanate mixtures which form fine emulsions. Such fine emulsions are difficult or impossible to achieve using conventional surfactants.

Compositions 4 to 9 were made using the materials set out in Table 3. The compositions comprise two main components, component A containing the hydroxyl functional acrylic Polymer 3, and component B containing a polyisocyanate.

Compositions 8 and 9 comprise a self emulsifying Polyisocyanate Mixtures 4 and 5 according to the invention. Comparative compositions 4 to 6 contain a polyisocyanate, Cythane 3160, and a conventional surfactant in Component B.

In Compositions 4, 5, 6, 8 and 9 the water was slowly added to other ingredients in component B with stirring to form an emulsion In Comparative Compositions 4, 5 and 6 the emulsions all phase separated on forming a film from them on a clean glass substrate using a block spreader with a 16 thousandths of an inch gap.

Compositions 8 and 9 gave stable fine particle size emulsions of particle sizes 331 and 88 nanometres respectively, as measured on a Malvern Instruments Autosizer IIC Photon Correlation Spectrometer.

In Comparative Composition 7 an attempt was made to emulsify Cythane 3160 in Polymer 3. This also phase separated within minutes on standing.

Mixing components A and B together gave coarse emulsions for Comparative Compositions 4 to 7 which when drawn down with a block spreader (16 thousandths of an inch gap) gave poor tacky uncured films after overnight dry under ambient conditions.

The films from Compositions 8 and 9 were tack free under the same conditions.

TABLE 3

| Composition | 4 | 5 | 6 | 7 | 8 | 9 |
|---|---|---|---|---|---|---|
| Component A | | | | | | |
| Hydroxy Polymer I | 54.9 | 54.9 | 54.9 | 54.9 | 54.9 | 54.9 |
| Demineralised water | — | — | — | 22.19 | — | — |
| Component B | | | | | | |
| Cythane | 15.76 | 15.76 | 15.76 | 15.76 | — | — |
| Cotin | 0.07 | 0.07 | 0.07 | 0.07 | 0.07 | 0.07 |
| M P A | 4.9 | 4.9 | 4.9 | 4.9 | 4.9 | 4.9 |
| G4809 | 1.25 | — | — | — | — | — |
| Levelan | — | 1.57 | — | — | — | — |
| Aerosol | — | — | 1.25 | — | — | — |
| Mixture 4 | — | — | — | — | 17.34 | — |
| Mixture 5 | — | — | — | — | — | 17.34 |
| Demin. water | 23.12 | 28.80 | 23.12 | — | 22.79 | 22.79 |

Abbreviations for Table 3;
Cotin is Cotin 430 (Trademark) a dioctyl tin dilaurate supplied by the Cosan Company.
G4809 is Atlas G4809 (Trademark) an emulsifying agent supplied by Imperial Chemical Industries.
Levelan is Levelan P208 (Trademark) an 80% aqueous solution of a nonyl phenol:20 ethylene oxide surfactant.
Aerosol is Aerosol OT100 (Trademark) the sodium salt of dioctyl sulphosuccinate.
M P A is methyl propoxol acetate.
Cythane is Cythane 3160.
Mixture 4 and Mixture 5 refer to Polyisocyanate Mixtures 4 and 5.

4.3 Comparison with a Solventborne Composition

A mixture of Polymer 1 (77.5 g), Cotin 430 (a 10% solution in methylethyl ketone;1.4 g), and demineralised water (35.85 g) was added to a mixture of Isocyanate Functional Oligomer 1 (16.8 g), Cythane 3160 (16.8 g) and N-methyl pyrrolidone (2.7 g) to form Composition 10 which was a clearcoat composition according to the invention.

Composition 10 was compared with a commercially available two component solvent borne clearcoat based on a mixture of an isocyanate functional oligomer and a hydroxyl functional acrylic resin (ICI Autocolour 2K P190-535 ,Trademark, available from Imperial Chemical Industries Plc). The clearcoat compositions were compared by applying each one by conventional spray over a commercial solvent borne silver basecoat, (ICI Autocolour P425-986-Trademark). The coatings were dried for two hours at ambient temperature and then baked at 60° C. for 30 minutes.

The 24 hour gloss, distinction of image (DOI) and König hardness, given in seconds, are shown in Table 4.

To measure the 24 hour gloss the test panels were left at ambient temperature for 24 hours after the end of the stoving step. The gloss was measured using an Erichsen Glossimeter (Trademark) at a 20° angle. Distinction of image was measured on a Hunterlab Dorigon Meter D47-6 (Trademark).

TABLE 4

| Clearcoat Composition | 20 h gloss | DOI | Koenig Hardness (s) |
|---|---|---|---|
| 10 | 88 | 83 | 42 |
| Autocolour 2K | 88 | 71 | 40 |

4.4. A waterborne alkyd topcoat

To demonstrate the use of the polyisocyanate mixtures of the invention in a coating composition with a hydroxyl functional alkyd polymer, a comparison was made between a clear-coat which comprised a commercially available hydroxy functional acrylated alkyd polymer and a composition according to the invention which comprised the same clear-coat composition with the addition of 10% by weight (based on total composition) of Polyisocyanate Mixture 5. The waterborne clear-coat used in the comparison comprised a mixture of the following components;

| Resydrol VWA 4180 | 97.46 parts |
|---|---|
| Additol VXW 4940 | 1.27 parts |
| Methylethyl ketoxime | 0.76 parts |
| Triethylamine | 0.51 parts |

Resydrol VWA 4180 is a hydroxyl functional acrylated alkyd from Hoechst (Resydrol is a trademark), Additol VXW 4949 (Trademark) is a drier from Hoechst.

The topcoats were applied as films having a wet film thickness of 150 microns over glass, and were allowed to dry at ambient temperature.

The Konig hardness of the clearcoat based on the alkyd resin alone was 23 seconds after 24 hours whereas that made from composition according to the present invention was 27 seconds. After 48 hours the comparative coating had a hardness of 30 seconds compared to 48 seconds for the composition of the invention. After one week the coatings had hardnesses of 37 and 61 seconds respectively.

4.5 Ratios of Polyisocyanate Mixture to Polymer

Pigmented coating compositions 11 to 14 were prepared comprising Polyisocyanate Mixture 6 and Polymer 4 in various ratios.

(a) Preparation of Composition 11

(i) Preparation of Phosphate Solution

A solution of alkylarylphosphate ester in butoxyethanol was made according to Example 1A of European Patent EP.B.0 206 615.

(ii) Preparation of Thickener

A solution of an acrylic emulsion thickener (sold under the Trade Mark primal ASE 60; 7.14 parts) was made in demineralised water (92.01 parts) and adjusted with triethylamine (0.85 parts) to pH 7.3.

(iii) Preparation of Aluminium Pigment Concentrate

Aluminium paste having a 65% metal content in a hydrocarbon carrier (sold under the Trade Mark Stapa R507; 5.72 parts) was mixed with butoxyethanol (4.17 parts), n-butanol (2.28 parts), phosphate solution prepared as described in (i) above (1.5 parts), and a hexamethoxy methyl melamine (available under the Trade Mark Beetle Be370; 1.0 part). Stirring was continued for 30 minutes to ensure complete mixing (iv) Preparation of Pigmented Composition 11

A basecoat composition was prepared as follows. A portion of the dispersion of Polymer 4 prepared as described in 3.4 above (208.46 parts), aluminium pigment concentrate prepared as described in (iii) above (123 77 parts) and thickener prepared as described in (ii) above (245.76 parts) were mixed and adjusted to pH 7.6 with aqueous dimethylaminoethanol solution (10%; 5.51 parts).

(b) Preparation of Compositions 12 to 14

Coating Compositions 12 to 14 were prepared by adding quantities of Polyisocyanate Mixture 6 to Composition 11. The quantities are given in Table 5 below. The quantities of Polyisocyanate Mixture 6 are by non-volatile weight based on the non-volatile weight of the total composition.

TABLE 5

| Composition | Polyisocyanate Mixture 6 |
|---|---|
| 11 | 0 |
| 12 | 5 |
| 13 | 10 |
| 14 | 25 |

These composition were applied by conventional spray over a commercially available primer (ICI Autocolour 2K Refinish Primer P565-693) on a steel substrate. They were allowed to dry at ambient temperature overnight.

The coated substrates were tested for König hardness and water resistance 24 hours after application. Water spot resistance was assessed by placing a spot of water onto the surface of the film and leaving it for 1 hour at ambient temperature. The water was wiped off with a soft cloth and the resistance was rated visually.

The test results are given in Table 6.

TABLE 6

| Composition | König Hardness (Seconds) | Water Resistance* |
|---|---|---|
| 11 | 57 | 0 |
| 12 | 57 | 1 |
| 13 | 73 | 2 |
| 14 | 80 | 3 |

*Water resistance is rated as follows:
0 is completely soluble.
1 is darkened with some attack.
2 is slightly marked.
3 is slightly marked but recovered when dry.

We claim:

1. A polyisocyanate mixture comprising;
   (i) an isocyanate functional oligomer, which is the reaction product of;
      (a) a polyisocyanate having tertiary isocyanate groups, and
      (b) a hydrophilic polyether having a group which will react with tertiary isocyanate groups, and
   (ii) a polyisocyanate having tertiary isocyanate groups.

2. A mixture according to claim 1 which contains from 1 to 20% by weight of NCO groups.

3. A mixture according to claim 1 which comprises from 2 to 80% by weight of hydrophilic polyether moiety derived from said polyether (b).

4. A mixture according to claim 1 in which said oligomer has an average isocyanate functionality of at least 1.1.

5. A mixture according to claim 1 in which said polyisocyanate (a) has an average isocyanate functionality per molecule of 2 to 6.

6. A mixture according to claim 1 in which said polyisocyanate (a) is the reaction product of 3 moles of 1,3-bis (1-isocyanato-1-methylethyl)-benzene with one mol of trimethylol propane.

7. A mixture according to claim 1 in which said hydrophilic polyether (b) is of the formula;

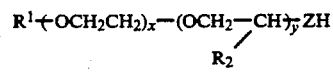

which has a block or random structure and in which $R^1$ is an alkyl group containing 1 to 4 carbon atoms, $R_2$ is a methyl group or an ethyl group, x is greater than 7, y is from 0 to x/3 and Z is oxygen, or NH.

8. A mixture according to claim 7 in which said hydrophilic polyether (b) is a methoxy poly(ethylene oxide) of molecular weight 350 to 2 000.

9. A mixture according to claim 1 in which said polyisocyanate (ii) is the same as said polyisocyanate (a).

10. A process for making a polyisocyanate mixture according to claim 1 which comprises mixing said oligomer (i) with said polyisocyanate (ii).

11. A process for making a polyisocyanate mixture according to claim 9 which comprises reacting an excess of said polyisocyanate (a) with said polyether (b).

12. An aqueous coating composition which comprises;
   i) a solution, emulsion or dispersion in an aqueous medium of a film-forming polymer having groups reactive with isocyanate groups, and
   ii) an emulsion in the aqueous medium of a polyisocyanate mixture according to claim 1.

13. A composition according to claim 12 in which said groups reactive with isocyanate groups are hydroxyl groups.

14. A composition according to claim 12 in which said film-forming polymer is an addition polymer or an alkyd polymer.

15. A composition which is in the form of two separate components which when combined form a coating composition according to claim 12, the composition comprising a first component which is an aqueous solution or dispersion of a film forming polymer having groups reactive with isocyanate groups, and a second component which comprises a polyisocyanate mixture as claimed in claim 1.

16. A process for making a composition according to claim 12 which comprises forming an emulsion of said polyisocyanate mixture in an aqueous solution or dispersion of said film-forming polymer.

17. A process of coating which comprises applying a layer of a composition according to claim 12 to a surface of a substrate and thereafter allowing or causing said layer to cure.

* * * * *